Feb. 4, 1969     D. N. JOHNSON ET AL     3,425,442
PRESSURE REGULATOR
Filed Nov. 24, 1965     Sheet 2 of 2

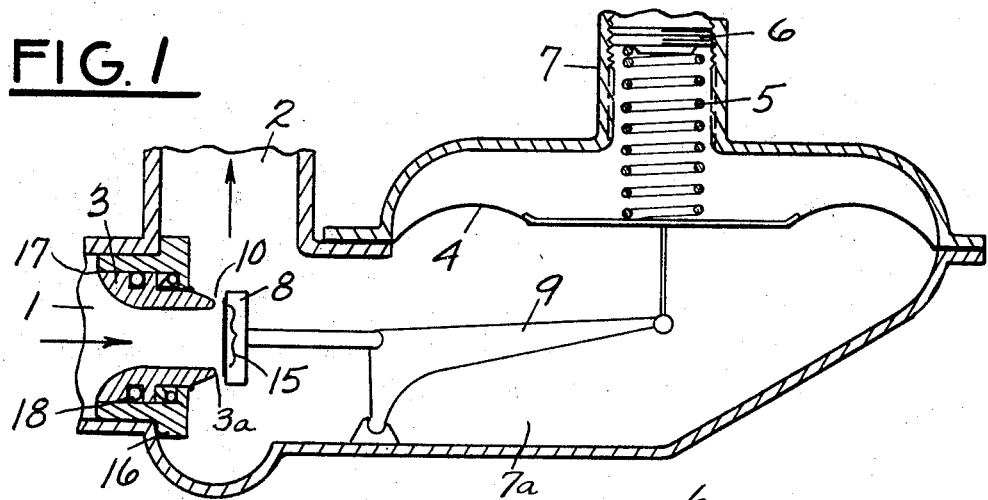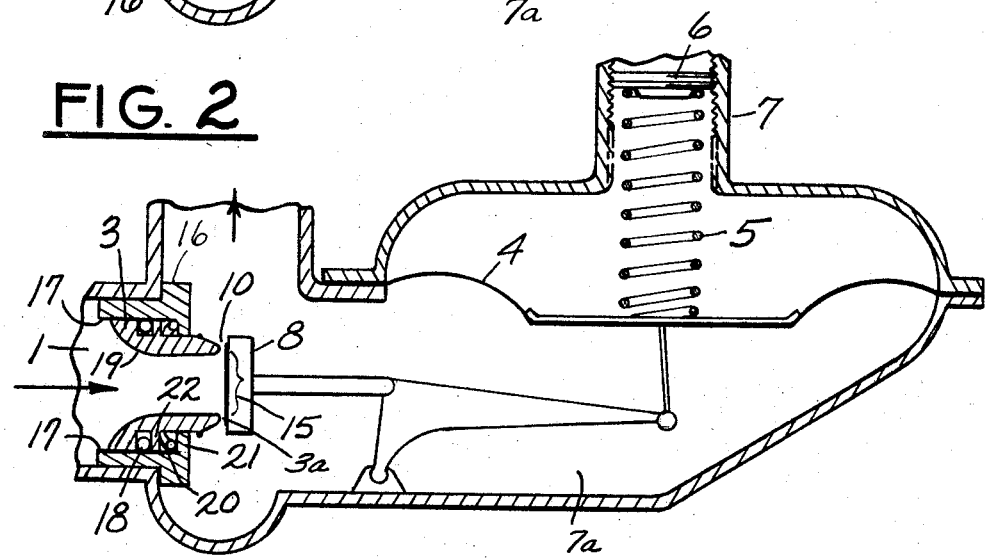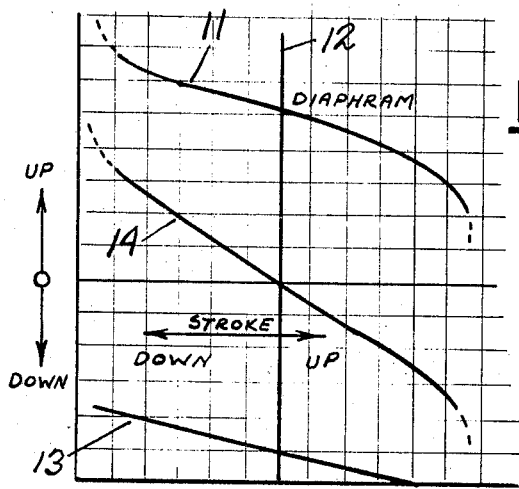

INVENTORS
Dwight N. Johnson
Albert R. Cameron
BY
Ralph Hammar
Attorney

United States Patent Office 3,425,442
Patented Feb. 4, 1969

3,425,442
PRESSURE REGULATOR
Dwight N. Johnson and Albert R. Cameron, Fullerton, Calif., assignors to American Meter Company, Philadelphia, Pa., a corporation of Delaware
Filed Nov. 24, 1965, Ser. No. 509,488
U.S. Cl. 137—505.15        1 Claim
Int. Cl. G05d *16/18;* F16k *31/12*

ABSTRACT OF THE DISCLOSURE

A spring loaded diaphragm type pressure regulator having two regulating valves whose relative position is controlled by the diaphragm and is also controlled by a piston subject to a force equal to the difference between the inlet and outlet pressures and to the counter force of a spring which deflects in proportion to the first force so the relative position of the regulating valve varies with the inlet pressure in which the diaphragm is lowered as the inlet pressure increases and thereby cancels out or compensates for the effect of inlet pressure on the regulating valve.

---

This invention is a pressure regulator in which compensation is introduced as a function of inlet pressure.

Figure 3:
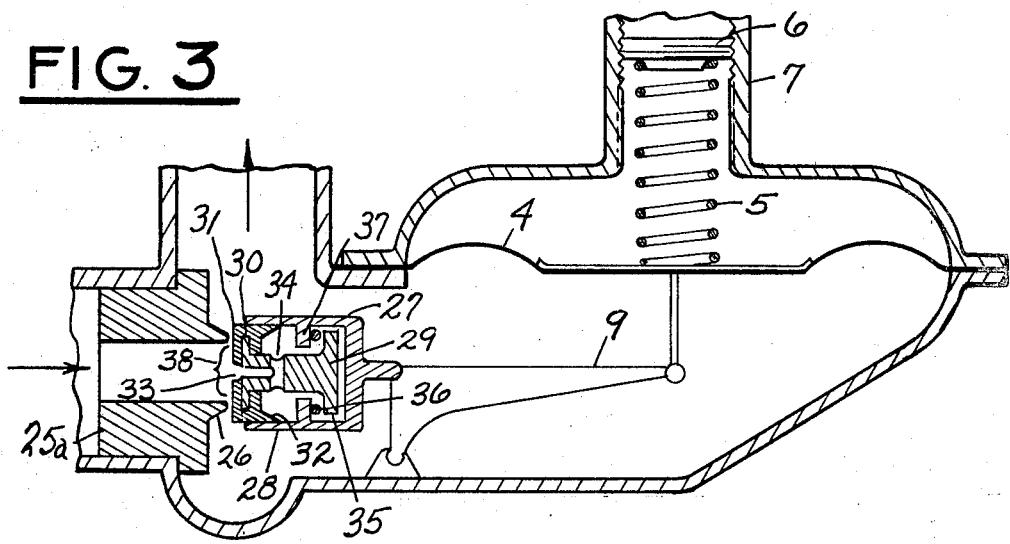
Figure 4:
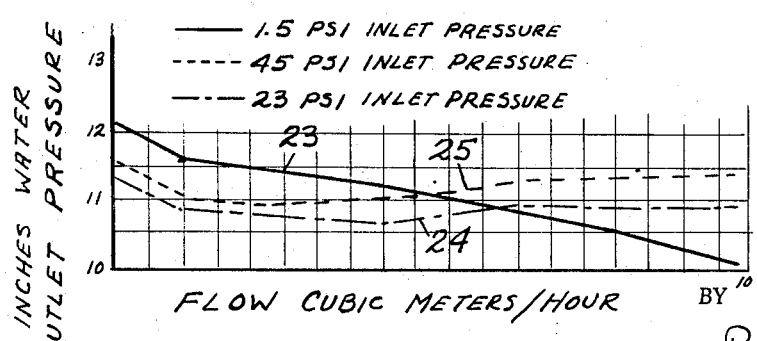

In the drawing, FIG. 1 is a section through a pressure regulator showing the position of the parts at low inlet pressure, FIG. 2 is a sectional view of the same regulator at high inlet pressure, FIG. 3 is a section through modifications, FIG. 4 is a diagram of output pressure compared to rate of flow for selected input pressures, and FIG. 5 is a diagram of the forces in the regulator.

In FIGS. 1 and 2 of the drawing, the conventional parts of the regulator are readily identified, 1 being the inlet, 2 the outlet, 3 the inlet orifice or valve seat member, and 4 the diaphragm loaded on its under side by the outlet pressure. The upper side of the diaphragm is loaded by suitable means such as a spring 5 exerting a downward force determined by the adjustment of a spring seat member 6 screwed into an upwardly extending tubular portion of the body or housing 7. The diaphragm 4 and spring 5 constitute control means responsive to pressure in the chamber 7a. In operation, the diaphragm moves up or down until the outlet pressure in the chamber 7a on the under side of the diaphragm reaches equilibrium with the spring pressure on the upper side of the diaphragm. The flow of gas or liquid through the orifice 3 is controlled by a valve closure member 8 having its position controlled by mechanism 9 connected to the diaphragm. As the outlet pressure falls, the diaphragm 4 moves downward, moving the valve member 8 away from the port 10 at the inner end of the orifice 3. This admits the larger amount of gas required to maintain the outlet pressure. In the conventional regulator, the inlet orifice 3 is mounted in fixed relation to the regulator housing. With this exception, the parts so far described are or may be of common construction and may differ substantially in appearance from the diagrammatic construction illustrated.

There are several factors which affect the operation of the regulator. First, at constant outlet pressure, the upward force exerted by the diaphragm 4 varies in accordance with the diaphragm position as indicated by the curve 11 in FIG. 5. As compared to a central position indicated by line 12, the upward force exerted by the diaphragm at constant outlet pressure increases as the diaphragm moves downward. This is a characteristic of diaphragms. Second, the downward force exerted by the spring 5 also varies with the diaphragm position as indicated by curve 13. The resultant or net force exerted on the diaphragm at constant outlet pressure varies with the diaphragm position as indicated by the curve 14 which is the sum of curves 11 and 13. Curve 14 shows the force applied to the linkage 9. Third, the gas pressure at the inlet 1 is applied to the central area 15 of the valve 8, producing a thrust directly proportional to the inlet pressure. The position of the valve 8 with respect to the port 10 accordingly does not depend solely upon the outlet pressure but rather is due to the balance between the downward forces exerted by the spring 5 and valve 8 against upward forces exerted by the diaphragm 4 so that as the inlet pressure rises, the outlet pressure has a corresponding increase.

In order to prevent unwanted increase in outlet pressure due to increased inlet pressure, the orifice 3 is movably mounted in a fitting 16 fixed to the housing. From one aspect, the orifice 3 comprises an annular piston slidably mounted in a cylinder 17 at the center of the fitting 16. The orifice is sealed to the cylinder walls by a piston ring such as O-ring 18. From this description it will be understood that the valve seat member 3 has a differential area thereon responsive to inlet pressure. The inlet pressure acts on the annular end face 19 of the orifice exerting a force proportional to the inlet pressure tending to move the orifice toward the right against a calibrated spring 20 arranged between a shoulder 21 on the fitting 16 and a shoulder 22 on the orifice. In FIG. 1, the orifice is shown in the position it occupies at low inlet pressures, for example 5 pounds per square inch. As the inlet pressure increases, the orifice moves to the right, as shown in FIG. 2, relative to the fitting 16 and in order to maintain the gas flow, the valve 8 must have a corresponding movement to the right and causing a downward movement of the diaphragm. The lower position or attitude of the diaphragm 4 causes a greater force for the same differential pressure as indicated by curve 14. Since the increase in inlet pressure causes an increase in valve thrust, in opposition to the increased force exerted by the diaphragm, the forces tend to cancel out and make the operation of the regulator less dependent of the inlet pressure. An example of the effect of changes in inlet pressure on the regulator performance is shown in FIG. 6 where curves 23, 24 and 25 show the variation in outlet pressure with flow for inlet pressures of 1½ pounds per square inch, 23 pounds per square inch and 45 pounds per square inch. Note that as the inlet pressure increases, the outlet pressure tends to remain more nearly constant. This construction eliminates the need for step down or double regulator installations in many applications where the inlet pressure is high. It also permits an increase in the regulator flow capacity through the use of larger diameter orifices and valve ports.

In the construction of FIGS. 1 and 2, the compensation for inlet pressure is part of the valve member 10 which is stationary in the conventional regulator design. In the regulator of FIG. 3, the compensation is built -into the valve member which is movable in the conventional regulator design. In this regulator, corresponding parts are indicated by the same reference numerals. The inlet orifice 25a is fixed in the regulator housing in the same manner as conventional regulators and has a valve port 26 presented toward a movable valve member 27 connected to and positioned by the linkage 9. The movable valve member 27 comprises a cylinder 28 having slidably mounted therein a piston 29 having a head 30 carrying an annular member 31 having a sealing lip 32 making sealing engagement with the bore of the cylinder 28. The cylinder 28 and piston 29 are each shown as single pieces but usually would be made of several pieces. At the center of the member 31 is a bore or a port 33 leading to a port 34 communicating with the inner surface of the member 31. The inner surface of the member 31 is accordingly subjected to the inlet pressure through the ports 33 and 34. Toward the bottom of the cylinder 28 the piston 29 has a flange 35 engaging a spring 36 seated on a flange 37 on the cylinder. As the inlet pressure increases, the piston 29 is moved toward the left compressing the spring 36 between the flanges 35 and 37. The effect of increased inlet pressure is to move the valve member 31 toward the valve port 26, thereby causing lowering of the diaphragm 4 and increasing its effective upward force for a given outlet pressure. This compensates for the increased force exerted on the central section 38 of the valve member by the increased inlet pressure and has the same kind of compensating effect as the spring mounted orifice in the FIG. 1 design. This form of regulator as shown in FIG. 3 is the subject of our copending application filed Oct. 18, 1968, Ser. No. 768,619.

In each of the regulators, one of the valve members, either the normally stationary valve member or the valve member positioned by the diaphragm, is moved in response to the inlet pressure in the direction to cause lowering of the diaphragm with increasing inlet pressure. This compensates for increasing inlet pressure by providing increasing force.

What is claimed as new is:

1. A pressure regulator comprising a body defining a pressure chamber, an inlet to said pressure chamber, an outlet from said pressure chamber, a valve seat member slidably mounted in said body at said inlet and having a differential area thereon responsive to inlet pressure, said seat member having a sliding sealing fit with respect to said body and having a passage therethrough, a first spring biasing said seat member away from said pressure chamber, a valve seat on said seat member at the pressure chamber side thereof, a valve closure member mounted for movement to and from said valve seat on the pressure chamber side thereof, the position of said seat member being determined by the pressure differential existing between the inlet and the outlet, and the seat member being movable toward the closure member upon increase in inlet pressure, the travel of the seat member being limited to an extent less than the travel of the closure member, control means responsive to pressure in said pressure chamber to shift said closure member toward and away from said valve seat, said control means including a second spring and a flexible diaphragm having one side exposed to said pressure chamber, and said first spring force being calibrated to permit movement of the seat member to compensate for the change in force of the second spring due to a change in operating position of the diaphragm brought about by an increase in inlet pressure.

References Cited

UNITED STATES PATENTS

| 2,732,853 | 1/1956 | Schwarz | 137—463 XR |
| 3,207,175 | 9/1965 | Pauly | 137—505.46 |
| 3,276,470 | 10/1966 | Griffing | 137—505.15 |
| 862,867 | 8/1907 | Eggleston. | |

FOREIGN PATENTS

| 1,133,926 | 11/1956 | France. |
| 8,602 | 2/1880 | Germany. |
| 172,335 | 11/1922 | Great Britain. |

HAROLD W. WEAKLEY, *Primary Examiner.*

U.S. Cl. X.R.

137—505.46